United States Patent [19]

West

[11] Patent Number: 4,776,528

[45] Date of Patent: Oct. 11, 1988

[54] APPARATUS FOR POSITIONING A TAKEUP REEL TO RECEIVE THE LEAD END OF A WEB

[75] Inventor: Daniel A. West, San Diego, Calif.

[73] Assignee: Eastman Kodak Company, Rochester, N.Y.

[21] Appl. No.: 92,970

[22] Filed: Sep. 3, 1987

[51] Int. Cl.$^4$ .................... G11B 15/32; H02P 1/00
[52] U.S. Cl. .................... 242/195; 318/258; 318/269
[58] Field of Search ............ 242/195, 67.1 R; 360/93, 96.5, 95; 318/258, 261, 264, 269, 302, 273

[56] References Cited

U.S. PATENT DOCUMENTS

| | | | |
|---|---|---|---|
| 2,753,502 | 7/1956 | Kylin | 318/265 |
| 3,127,546 | 3/1964 | Moser et al. | 318/630 X |
| 3,374,410 | 3/1968 | Cronquist et al. | 318/254 |
| 3,423,658 | 1/1969 | Barrus | 318/138 |
| 3,633,084 | 1/1972 | Rakes | 318/254 |
| 3,663,877 | 5/1972 | Clark | 318/254 |
| 3,757,191 | 9/1973 | Agati et al. | 318/685 |
| 3,761,790 | 9/1973 | Daab | 318/467 |
| 3,906,315 | 9/1975 | Gotisar | 318/212 |
| 4,409,530 | 10/1982 | Neeper et al. | 318/685 |
| 4,455,515 | 6/1984 | Uzuka | 318/254 |
| 4,547,692 | 10/1985 | Spaulding | 318/592 |
| 4,577,811 | 3/1986 | Bray et al. | 242/195 |
| 4,631,457 | 12/1986 | Tanuma et al. | 318/254 |

Primary Examiner—David Werner
Attorney, Agent, or Firm—William F. Noval

[57] ABSTRACT

In a reel-to-reel web transport (such as a magnetic tape recorder), apparatus is provided for accurately positioning a takeup reel to receive the lead end of a web. The takeup reel is rotated in web supply and takeup directions by a brushless direct current (DC) motor. A magnetic hysteresis brake is coupled to the takeup reel when the reel is rotated in a web supply direction. The rotational position of the takeup reel to receive the lead end of a web is coincident with a stable torque equilibrium position of the DC motor. A control circuit is provided (1) for commutating the DC motor in a supply direction to couple said brake to said takeup reel, until a position sensor associated with the reel is actuated; (2) for commutating the motor for one more cycle in the same direction to bring the motor to rest at a position past the predetermined position; and (3) for commutating the DC motor for one cycle in the reverse direction, to uncouple the brake from the takeup reel and to bring the motor to rest at the stable equilibrium position which is coincident with the web receiving position of the takeup reel.

4 Claims, 4 Drawing Sheets

APPARATUS FOR POSITIONING A TAKEUP REEL TO RECEIVE THE LEAD END OF A WEB

BACKGROUND OF THE INVENTION

This invention relates in general to reel to reel web transport apparatus and more particularly, to reel to reel web transport apparatus in which a takeup reel is accurately positioned to accept the lead end of a web.

In devices in which a web (such as magnetic tape or film) is transported between a supply reel and a takeup reel past a utilization station (such as a magnetic head or optical projection device), the web is commonly contained on a reel (which may be supported in a cartridge) which is replaceably mounted in the device. When the reel of web is initially inserted in the web utilization device, (such as by inserting a cartridge of magnetic tape into a magnetic tape recorder), the leading end of the web is either manually or automatically threaded through a web transport path and secured to a takeup reel. If the threading is done automatically, the leading end of the web may be attached to a leader block which is threaded through the web transport path and inserted into a slot in the takeup reel hub. In such a threading operation, it is desirable that the slot in the hub of the takeup reel be positioned accurately so that the leader block is properly threaded into the hub. It is also desirable that the motor and control system for positioning the takeup reel during threading is simple, efficient and effective.

SUMMARY OF THE INVENTION

According to the present invention there is provided an apparatus for positioning a takeup reel for receiving the lead end of a web. The apparatus is simple, accurate and efficient. According to an aspect of the invention, a takeup reel is rotated to a predetermined position (at which the lead end of a web is secured to the reel) by a brushless direct current motor having a stable torque equilibrium position which coincides with said predetermined position. According to another aspect of the present invention, the effect of a magnetic hysteresis brake which is coupled to the takeup reel when it is rotated by the brushless DC motor in a supply direction is compensated for, so that the reel is brought to the predetermined web takeup position. The motor is commutated in a supply direction until a position sensor is actuated. The motor is then commutated for one more cycle to bring the motor to rest at a position beyond the predetermined position. The motor is now commutated for one cycle in a reverse direction to uncouple the brake from the reel and bring the motor to rest at thd stable equilibrium position coincident with the takeup position.

DESCRIPTION OF THE DRAWINGS

In a detailed description of a preferred embodiment of the invention presented below, reference is made to the accompanying drawings in which like numerals refer to like elements.

DESCRIPTION OF THE PREFERRED EMBODIMENT

Although the present invention will be described with respect to a reel to reel magnetic tape transport apparatus, it will be understood that the present invention may be used advantageously in any reel to reel web transport apparatus.

Figure 1:
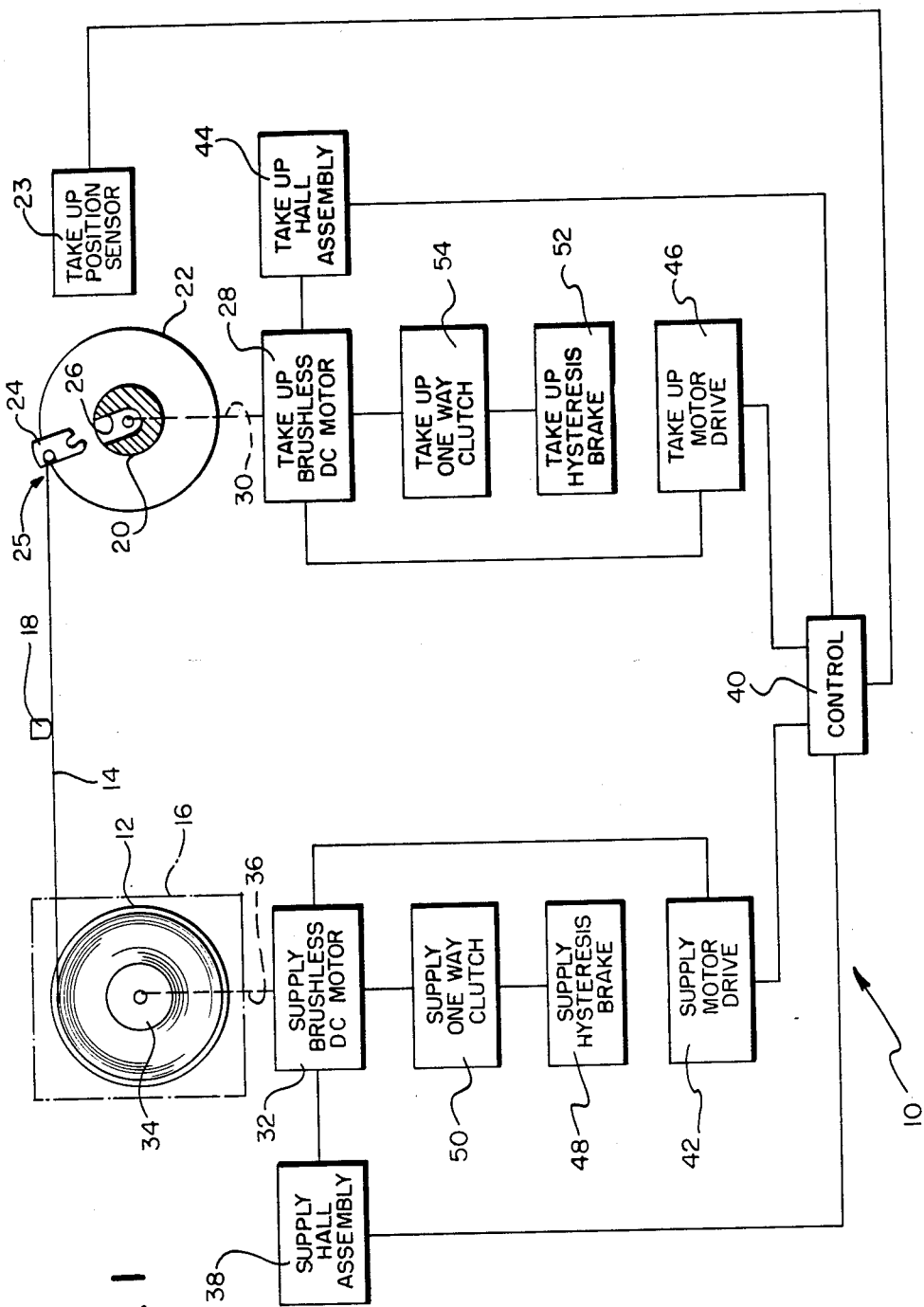
FIG. 1 is a block schematic diagram showing web transport apparatus including an embodiment of the present invention.

As shown in FIG. 1, a web transport apparatus, such as reel to reel magnetic tape transport 10, includes a supply reel 12 of magnetic tape 14 in a cartridge 16. When cartridge 16 is inserted into apparatus 10, tape 14 is transported (by a mechanism, not shown) from cartridge 16, past magnetic head 18 and is secured to hub 20 of takeup reel 22 by insertion of leader block 24 (to which the lead end 25 of tape 14 is attached) into slot 26 of hub 20. Magnetic tape 14 is transported between reels 12 and 22 by takeup brushless DC motor 28, which is directly connected to hub 20 by means of shaft 30, and a supply brushless DC motor 32, which is directly connected to hub 34 of supply reel 12 by shaft 36.

In an exemplary magnetic tape recorder 10, tape 14 is alternately transported between reels 12 and 22. Information is recorded on tape 14 by magnetic head 18 in successive longitudinal tracks which extend parallel to the direction of movement of tape 14. Control of motor 32 is effected by means of supply Hall assembly circuit 38, control circuit 40 and supply motor drive circuit 42. Hall assembly circuit 38 includes a plurality of Hall effect devices (mounted circumferentially on the stator of motor 32) which produce signals which are indicative of the position of the rotor of motor 32. Control circuit 40 produces control voltages and commutation control signals which are a function of the Hall signals to control the operation of DC motor 32.

Similarly, control of takeup motor 28 is effected by means of takeup Hall assembly circuit 44, control circuit 40 and takeup motor drive circuit 46. The Hall effect devices of assembly 44 produce position control signals which are used by control circuit 40 to produce suitable control voltages and commutation signals for controlling the speed and direction of rotation of motor 28.

A supply magnetic hysteresis brake 48 is coupled to output shaft 36 of supply motor 32 by means of one-way clutch 50. A takeup magnetic hysteresis brake 52 is coupled to output shaft 30 of takeup motor 28 by takeup one-way clutch 54. Magnetic hysteresis brakes 48 and 52 produce essentially constant torque independent of rotational speed. Since a brake is only coupled to a reel when the reel is rotated in a tape supply direction, a controlled torque is applied to the reel which effects a controlled tension on tape 14. This tension is independent of the rotational speed of the reel supplying tape. Thus, when tape 14 is transported from reel 12 to reel 22, supply hysteresis brake 48 is coupled to shaft 36 by means of one-way clutch 50, to apply a holdback torque to reel 12 and a controlled tension to tape 14. On the other hand, as tape 14 is taken up onto reel 22, takeup hysteresis brake 52 is uncoupled from reel 22.

Figure 3:
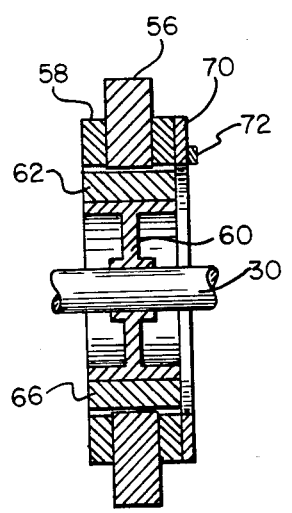
FIGS. 3 and 4 are respectively partially sectional side elevational and front elevational diagrammatic views of an exemplary brushless, direct current motor for use in the apparatus of FIG. 1.
Figure 4:
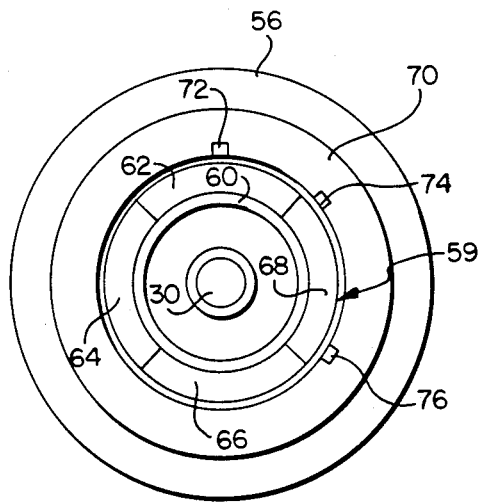
Figure 2:
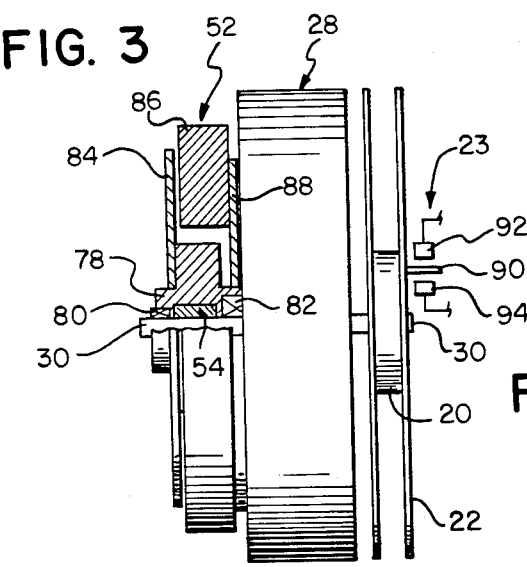
FIG. 2 is a partially sectional, elevational view illustrating one arrangement of brushless DC motor, one-way clutch, magnetic hysteresis brake, and position sensor to be used in the apparatus of FIG. 1.

Referring now to FIGS. 2, 3, and 4 there is shown, in greater detail, an exemplary brushless DC motor such as motor 28; one-way clutch 54; hysteresis brake 52; and Hall devices. As shown in FIGS. 3 and 4, takeup brushless DC motor 28 includes a stator 56 having a three phase, Y connected winding 58 and a rotor assembly 59. Assembly 59 includes a hub 60 mounted on shaft 30 and permanent magnets 62, 65, 66, and 68 circumferentially mounted on hub 60. A circuit board assembly 70, mounted on stator 56, includes Hall effect devices 72, 74 and 76 (Hall assembly 44), which are circumferentially spaced about rotor assembly 59. Circuit board assembly 70 also includes electrical connections (not shown) for supplying power to the stator coils 58; for supplying bias to Hall effect devices 72, 74 and 76, and for receiving Hall output signals from devices 72, 74 and 76. As each of the permanent magnets 64–68 passes a Hall device 72, 74, 76 a Hall output signal will be produced which is a function of the magnetic field produced by the permanent magnet. For a complete rotation of rotor assembly 59, each Hall signal will complete four cycles. However, because devices 72, 74 and 76 are angularly spaced apart by 60° mechanical, the signals from these devices will be 240° electrical out of phase with each other. The Hall signals are used by control circuit 40 to produce suitable control voltages and commutation switching signals to control the operation of motor 28.

Referring to FIG. 2, takeup magnetic hysteresis brake 52 includes a hub 78, rotatably mounted on shaft 30 by means of bearings 80 and 82; a magnetic hysteresis disc 84 mounted on hub 78; and a stationary permanent magnet 86 mounted on magnetic plate 88 (secured to the housing of motor 28). One-way clutch 54 (which may, for example, be a drawn cup roller one-way clutch) is mounted between shaft 30 and hub 78. In the tape supply direction of rotation of motor 28, one-way clutch 54 locks hub 78 to shaft 30. Disc 84 rotates with shaft 30 and a torque is exerted on shaft 30 through the interaction of magnetic hysteresis disc 84 with permanent magnet 86.

Reel 22 is also mounted on shaft 30 by means of hub 20. Position sensor 23 includes a flag 90 mounted on hub 20 and an optical sensing device including transmitter 92 and receiver 94. As will be explained in greater detail later, when device 23 is actuated, it provides an indication signal to control circuit 40 to stop motor 28, so that slot 26 in takeup reel hub 20 is in a correct angular orientation to accept leader block 24.

Supply motor 32, supply one-way clutch 50, supply hysteresis brake 48 and supply Hall assembly 38 are preferably identical in construction to the components shown in FIGS. 2–4.

Figure 5:
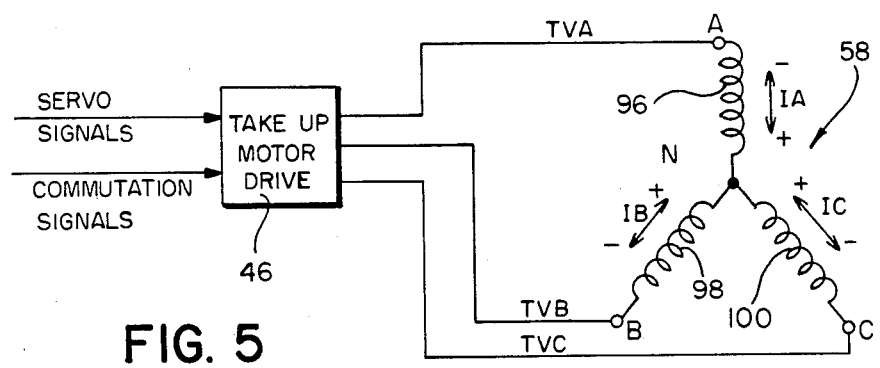
FIG. 5 is a schematic diagram showing details of an exemplary motor drive circuit of the apparatus of FIG. 1.
Figure 6A:
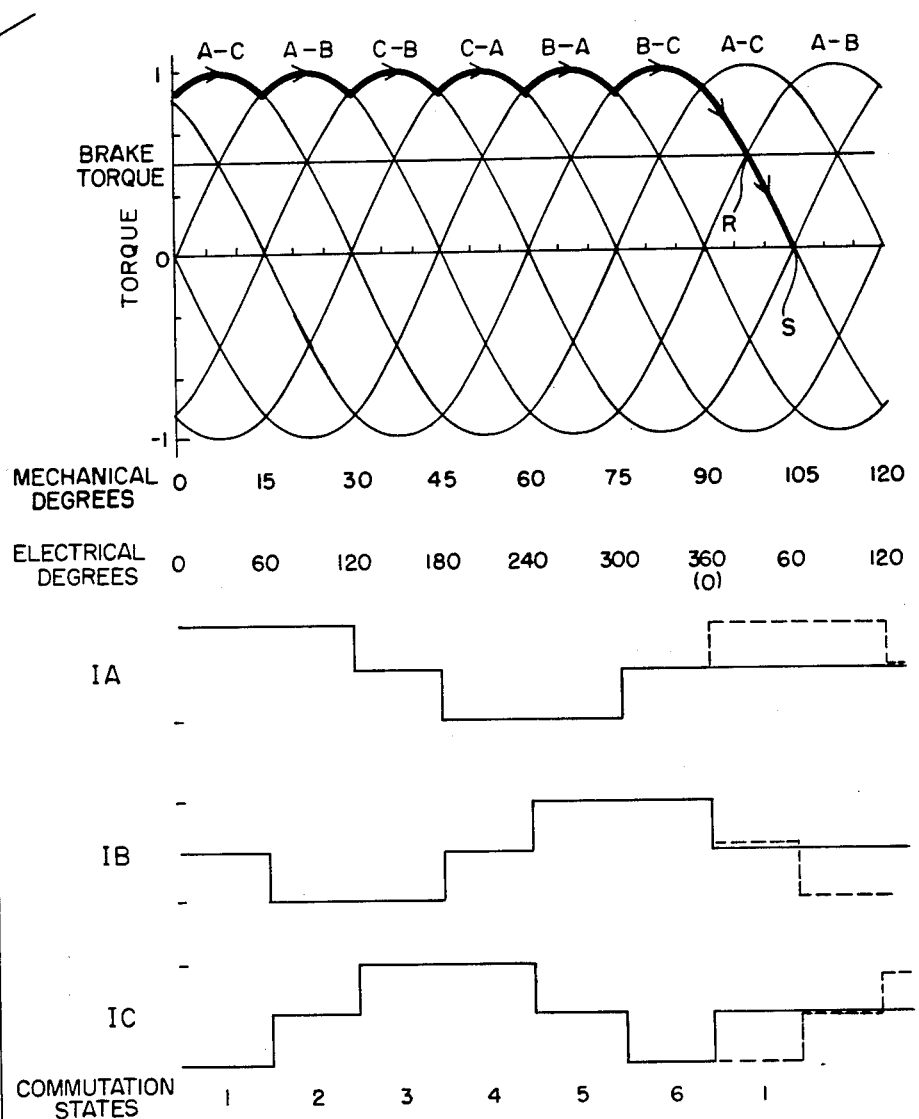
FIGS. 6A, 6B and 6C are waveform diagrams which illustrate the operation of the present invention.

Referring now to FIGS. 5 and 6A, there will be described in greater detail the control of motor 28. As shown in FIG. 5, the windings 58 of motor 28 are wound on stator 56 in a three phase, Y connection. As shown in FIG. 5, winding assembly 58 of motor 28 includes windings 96, 98 and 100 connected in a three phase, Y connection. Phase A winding 96 is connected between a terminal A and terminal N; phase B winding 98 is connected between terminal B and terminal N; and phase C winding 100 is connected between terminal C and terminal N. Takeup motor drive circuit 46 receives commutation signals and voltage signals from control circuit 40 and applies appropriate voltage TVA to terminal A, voltage TVB to terminal B, and voltage TVC to terminal C to respectively produce current IA through winding 96; current IB through winding 98; and current IC through winding 100 to effect rotation of rotor assembly 59, output shaft 30 and reel 22.

As explained above, a complete 360° electrical cycle is effected for each 90° of mechanical rotation of rotor assembly 59. For the three phase, Y connected winding of FIG. 5, current through the windings is commutated six times during each complete electrical cycle (i.e., once every 60 electrical degrees or once every 15 mechanical degrees) of rotation of assembly 59. As shown in FIG. 6A, during state 1, current flows from terminal A to terminal C through windings 96 and 100; during state 2, current flows from terminal A to terminal B through windings 96 and 98; during state 3, current flows from terminal C to terminal B through windings 100 and 98; during state 4, current flows from terminal C to terminal A through windings 100 and 96; during state 5, current flows from terminal B to terminal A through windings 98 and 96; and during state 6, current flows from terminal B to terminal C through windings 98 and 100. During any commutation state, the current through two windings is equal (but opposite) while the current through the third winding is zero. For example, during state 1, IA = −IC and IB = 0.

As shown in the torque-position curves of FIG. 6A, the torque curve for each phase is cyclical and includes a region of maximum torque during which current is commutated. Thus, the solid black line of FIG. 6A depicts the composite torque when current through the three phase windings is commutated every 15° (Mech.). Each torque-position curve has associated with it a stable equilibrium position at which the motor can be brought to rest. By terminating commutation of the motor, the motor will rotate to a stop at the equilibrium position associated with the torque curve of the last commutation cycle.

By aligning the takeup slot 26 of hub 20 of reel 22 with an equilibrium position of motor 28, reel 22 can be accurately positioned by commutating motor 28 in the normal sequence of A-C, A-B, C-B, C-A, B-A, and B-C and sensing the position of the reel 22 by takeup position sensor 23. During the commutation cycle B-C, if commutation is terminated, the motor and reel 22 come to rest at the equilibrium position S (FIG. 6A) of torque curve B-C at 105° (Mech.). Although this technique may be useful when motor 28 rotates reel 22 in a takeup direction, when reel 22 is rotated in a supply direction, the magnetic hysteresis brake 52 is coupled by means of clutch 54 to reel 22 to bring the motor and reel to a stop at a position in advance of the equilibrium position (for example, at position R in FIG. 6A).

Figure 6B:
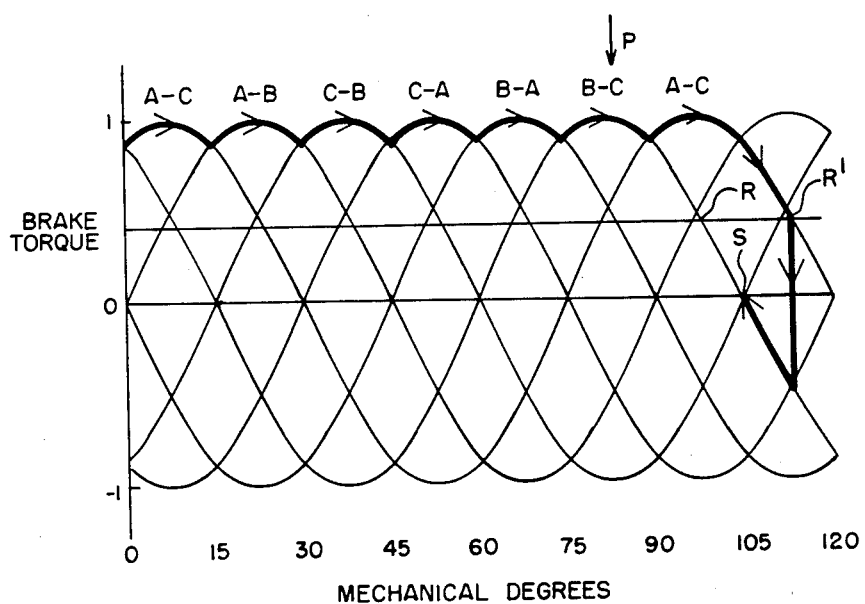

According to the present invention, the torque effect of the magnetic hysteresis brake on the reel is compensated for (1) by commutating the motor for one more cycle after the actuation of the position sensor, to bring the motor to rest at a position $R^1$, past the equilibrium position S, and (2) by commutating the motor in the reverse direction for one cycle, to uncouple the hysteresis brake from the reel, and to bring the motor to rest at the equilibrium position S which is coincident with the predetermined position of the reel to accept the lead end of the tape. This sequence of operation is illustrated in FIG. 6B. After the position sensor is actuated during the B-C commutation cycle (as indicated by arrow P), commutation is continued in the same direction for one more cycle (A-C). The motor stops at a rotational position $R^1$ past the desired position S. The motor is then commutated in a reverse direction for one cycle (B-C) to bring the motor to rest at the desired equilibrium position S.

Figure 6C:
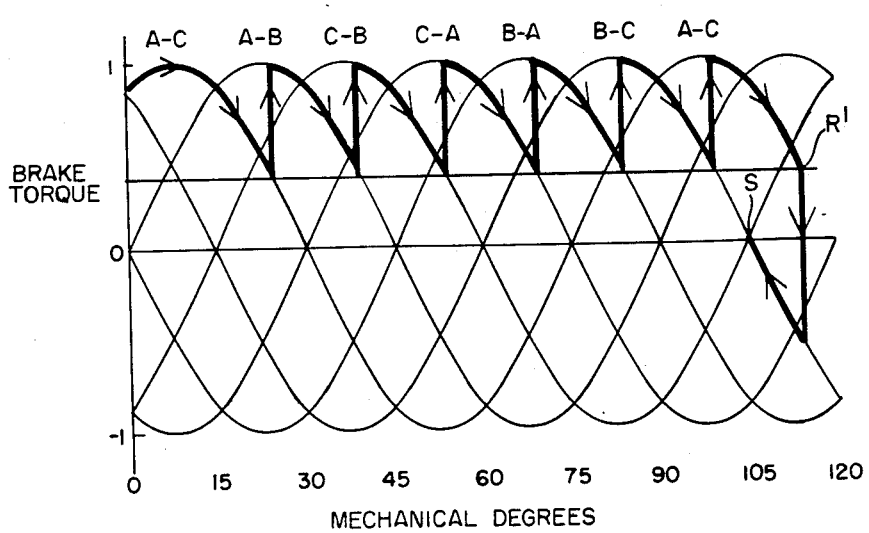

A different commutation scheme is shown in FIG. 6C, in which motor 28 is operated as a step motor. In this operational mode, instead of commutating the motor during the peak torque segment of each torque curve, the motor is allowed to come to a rest position, (for example, during the A-C commutation cycle). The motor is then stepped from one rest position to the next rest position until the position sensor is actuated. The motor is commutated one more step in the same direction and one step in the reverse direction to rotate the motor to the desired equilibrium position S.

The invention has been described in detail with particular reference to preferred embodiments thereof, but it will be understood that variations and modifications can be effected within the spirit and scope of the invention.

What is claimed is:

1. Web transport apparatus comprising:
   a rotatably mounted takeup reel having a predetermined rotational position for receiving the lead end of a web;
   a brushless direct current motor connected to said reel for rotating said reel in a web takeup direction and in a reverse web supply direction; wherein said motor has a plurality of stable torque equilibrium positions and wherein said predetermined web receiving position is coincident with one of said stable equilibrium positions;
   a magnetic hysteresis brake which is coupled to said reel when said reel is rotated in a supply direction and which is uncoupled from said reel when said reel is rotated in a takeup direction;
   sensor means for sensing the rotational position of said takeup reel relative to said predetermined position;
   commutation means for commutating said motor in said web supply and web takeup directions; and
   control means for controlling said commutation means (1) to commutate said motor in a supply direction, to couple said hysteresis brake to said takeup reel, until said sensor means is actuated; (2) to commutate said motor for one more cycle in the same direction to bring said motor to rest at a rotational position past said predetermined position; and (3) to commutate said motor for one cycle in the reverse direction to uncouple said magnetic hysteresis brake from said takeup reel and to bring said motor to rest at said stable equilibrium position which is coincident with said predetermined web receiving position.

2. Magnetic tape transport apparatus comprising:
   a rotatably mounted takeup reel having a predetermined rotational position for receiving the lead end of magnetic tape;
   a brushless direct current motor connected to said reel for rotating said reel in opposite tape takeup and tape supply directions; wherein said motor has a plurality of stable torque equilibrium positions and wherein said predetermined web receiving position is coincident with one of said stable equilibrium positions;
   a magnetic hysteresis brake which is coupled to said reel when said reel is rotated in a supply direction and which is uncoupled from said reel when said reel is rotated in a takeup direction;
   sensor means for sensing the rotational position of said takeup reel relative to said predetermined position;
   commutation means for commutating said motor in said tape supply and tape takeup directions; and
   control means for controlling said commutation means (1) to commutate said motor in a tape supply direction, to couple said hysteresis brake to said takeup reel, until said sensor means is actuated; (2) to commutate said motor for one more cycle in said supply direction to bring said motor to rest at a rotational position past said predetermined position; and (3) to commutate said motor for one cycle in the reverse direction to uncouple said brake from said takeup reel and to bring said motor to rest at said stable equilibrium position which is coincident with said predetermined tape receiving position.

3. The apparatus of claim 2 wherein said takeup reel includes means for securing the lead end of said tape to said reel.

4. The apparatus of claim 3 wherein the lead end of said magnetic tape is attached to a leader block and wherein said takeup reel includes a hub having a slot for receiving said leader block to secure the lead of said tape to said takeup reel.

* * * * *